United States Patent
Wang et al.

(10) Patent No.: US 9,628,940 B2
(45) Date of Patent: Apr. 18, 2017

(54) CLASS IDENTIFICATION METHODS FOR MACHINE-TO-MACHINE (M2M) APPLICATIONS, AND APPARATUSES AND SYSTEMS USING THE SAME

(75) Inventors: Guotong Wang, Beijing (CN); Anthony Lee, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 1236 days.

(21) Appl. No.: 13/291,256

(22) Filed: Nov. 8, 2011

(65) Prior Publication Data

US 2012/0117140 A1 May 10, 2012

Related U.S. Application Data

(60) Provisional application No. 61/411,009, filed on Nov. 8, 2010.

(51) Int. Cl.
| | |
|---|---|
| *G06F 15/16* | (2006.01) |
| *G06F 15/173* | (2006.01) |
| *H04M 1/66* | (2006.01) |
| *G06F 11/00* | (2006.01) |
| *H04W 4/00* | (2009.01) |
| *H04W 28/24* | (2009.01) |

(52) U.S. Cl.
CPC ............ *H04W 4/005* (2013.01); *H04W 28/24* (2013.01)

(58) Field of Classification Search
CPC ....... H04W 4/005; H04W 4/00; H04W 72/04; H04W 24/02; H04W 48/16; H04W 74/0833; H04W 28/0215
USPC .......................................... 709/201
See application file for complete search history.

(56) References Cited

U.S. PATENT DOCUMENTS

| | | | | |
|---|---|---|---|---|
| 2009/0191858 | A1* | 7/2009 | Calisti | 455/422.1 |
| 2010/0302968 | A1* | 12/2010 | Lu et al. | 370/252 |
| 2011/0201307 | A1* | 8/2011 | Segura | 455/411 |
| 2011/0252235 | A1* | 10/2011 | Dolan | 713/168 |
| 2011/0270984 | A1* | 11/2011 | Park | 709/225 |

* cited by examiner

*Primary Examiner* — Tonia L Dollinger
*Assistant Examiner* — Kishin G Belani
(74) *Attorney, Agent, or Firm* — Schiff Hardin LLP

(57) ABSTRACT

A mobile communication device for application-based class identification is provided with a wireless module and a controller module. The wireless module performs wireless transmissions and receptions to and from a service network. The controller module determines a class of a Machine-to-Machine (M2M) application, and determines a priority level corresponding to the class of the M2M application. Also, the controller module initiates the M2M application via the wireless module according to at least one M2M parameter corresponding to the priority level.

30 Claims, 4 Drawing Sheets

CLASS IDENTIFICATION METHODS FOR MACHINE-TO-MACHINE (M2M) APPLICATIONS, AND APPARATUSES AND SYSTEMS USING THE SAME

CROSS REFERENCE TO RELATED APPLICATIONS

This Application claims the benefit of U.S. Provisional Application No. 61/411,009, filed on Nov. 8, 2010, and the entirety of which is incorporated by reference herein.

BACKGROUND OF THE INVENTION

Field of the Invention

The invention generally relates to class identification for Machine-to-Machine (M2M) applications, and more particularly, to application-based class identification which allows delay-sensitive M2M applications to have higher priority than delay-tolerant M2M applications and even non-M2M applications.

Description of the Related Art

For a long time, various machines have been provided to make our lives more convenient in every way. Generally, machines, nowadays, are equipped with computing processors and software to accommodate us with more intelligence-based services. With the advancement of wireless communications, Machine-to-Machine (M2M) technology has been developed to enable communications between remote machines for exchanging information and operating without human interaction. Especially for critical public infrastructures, such as water treatment facilities or bridges, M2M sensors may be employed to monitor the operation statuses of facilities and report measurement results back to control centers via wireless communication networks, such as a Global System for Mobile Communication/General Packet Radio Service (GSM/GPRS), Universal Mobile Telecommunication System (UMTS), 1× Code Division Multiple Access 2000 (1× CDMA 2000) system, 1× High Rate Packet Data (1×HRPD) system, and Long Term Evolution (LTE) system, etc. This allows administrators of the critical public infrastructures to know if certain elements have been tampered with. Other applications may be earthquake monitoring, electric metering, gas/oil pipeline monitoring, or coke machine maintenance for reporting operation statuses to a centralized system via wireless communication networks, such that related services with higher efficiency and lower maintenance costs may be provided.

Taking the LTE technology in compliance with release 10 of the 3GPP specification as an example, a low priority indicator is defined for Machine Type Communication (MTC) devices to indicate that any M2M application initiated therefrom or thereto should be assigned with a priority level lower than the priority level of a non-M2M application, due to the fact that the amount of data per report is usually small and the data content therein is generally delay-tolerant. However, there are situations where the data content reported by an M2M application may be critical and delay-sensitive, e.g., an earthquake is detected by an earthquake monitoring application, or a leak of a monitored oil-pipeline is detected by an oil pipeline monitoring application. In these cases, assigning a low priority level to all M2M applications may cause serious delay for the delivery of the critical reports. In addition, as the number of different smart phones entering the mobile markets increases, network congestion may occur more easily than before. Thus, it is desirable to improve the way of class identification, so that priority levels may be assigned in an application-based manner, instead of a device-based manner, to guarantee privileged access for certain M2M applications and to improve network throughput.

BRIEF SUMMARY OF THE INVENTION

In one aspect of the invention, a mobile communication device is provided. The mobile communication device comprises a wireless module and a controller module. The wireless module performs wireless transmissions and receptions to and from a service network. The controller module determines a class of an M2M application, and determines a priority level corresponding to the class of the M2M application. Also, the controller module initiates the M2M application via the wireless module according to at least one M2M parameter corresponding to the priority level.

In another aspect of the invention, a class identification method for M2M applications by a mobile communication device is provided. The class identification method comprises the steps of determining a class of an M2M application, determining a priority level corresponding to the class of the M2M application, and initiating the M2M application according to at least one M2M parameter corresponding to the priority level.

In another aspect of the invention, a service network is provided. The service network comprises an access node and a control node. The access node performs wireless transmissions and receptions to and from a mobile communication device. The control node determines a class of an M2M application, and determines a priority level corresponding to the class of the M2M application. Also, the control node initiates the M2M application via the access node according to at least one M2M parameter corresponding to the priority level.

In another aspect of the invention, a class identification method for M2M applications by a service network is provided. The class identification method comprises the steps of determining a class of an M2M application, determining a priority level corresponding to the class of the M2M application, and initiating the M2M application via the access node according to at least one M2M parameter corresponding to the priority level.

Other aspects and features of the invention will become apparent to those with ordinary skill in the art upon review of the following descriptions of specific embodiments of the mobile communication device, the service network, and the class identification method for M2M applications.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
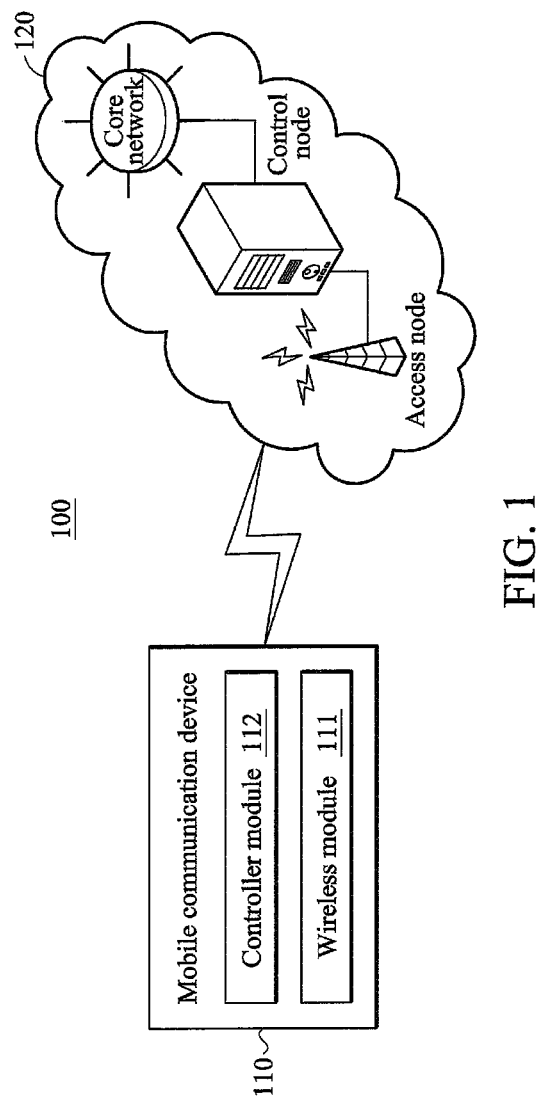
FIG. 1 is a block diagram illustrating a mobile communication system according to an embodiment of the invention.

FIG. 1 is a block diagram illustrating a mobile communication system according to an embodiment of the invention. In the mobile communication system 100, the mobile communication device 110 is wirelessly connected to the service network 120 via an air interface. The service networks 120 comprises at least one access node for performing wireless transmissions and receptions to and from the mobile communication device 110, and a control node for controlling the operation of the at least one access node, wherein the control node is further connected to a core network. The mobile communication device 110 comprises a wireless module 111 for performing the functionality of wireless transmissions and receptions. To further clarify, the wireless module 111 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz or 2100 MHz utilized in UMTS systems, or may be 900 MHz, 2100 MHz, or 2.6 GHz utilized in LTE or LTE-Advanced systems, or others depending on the Radio Access Technology (RAT) in use. Also, the mobile communication device 110 comprises a controller module 112 for controlling the operation of the wireless module 111 and other function components, such as a display unit and/or keypad serving as the MMI (man-machine interface), a storage unit storing the program codes of applications or communication protocols, or others. To be more specific, the controller module 112 controls the wireless module 111 to initiate M2M applications with the service network 120 according to the application-based class identification methods of the invention. In one embodiment, the mobile communication device 110 may be an MTC device, while in another embodiment, the mobile communication device 110 may be a non-MTC device (e.g., a mobile telephone, a laptop computer with wireless communications capability, or a Personal Digital Assistant (PDA) phone, etc.) which is capable of initiating M2M applications or M2M-like applications, such as mobile barcode applications.

The invention first proposes to introduce M2M Class Identifiers (MCIs) for indicating the classes of M2M applications, and the MCIs are determined during the Quality of Service (QoS) negotiation procedure. With the MCI, the corresponding priority level may be determined according to the mapping relations between the classes of applications and the corresponding priority levels. In one embodiment, the MCIs may be defined as new QoS Class Identifiers (QCIs) in a predetermined QCI table which contains the mapping relations between the classes of applications and the corresponding priority levels, and the QoS attributes for each class of applications. An exemplary QCI table with 3 MCIs is given as follows.

TABLE 1

| QCI | Resource Type | Priority Level | Packet Delay Budget | Packet Error Loss Rate | Example Services |
|---|---|---|---|---|---|
| 1 | Guaranteed Bit Rate (GBR) | 2 | 100 ms | $10^{-2}$ | Converstaional Voice |
| 2 | | 4 | 150 ms | $10^{-3}$ | Converstaional Video (Live Streaming) |
| 3 | | 3 | 50 ms | $10^{-3}$ | Real Time Gaming |
| 4 | | 5 | 300 ms | $10^{-6}$ | Non-Converstaional Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming), TCP-based (e.g., www, e-mail, chat, ftp, p2p file sharing, progressive video, etc.) |
| 7 | | 7 | 100 ms | $10^{-3}$ | Voice, Video (Live Streaming), Interactive Gaming |
| 8 | | 8 | 300 ms | $10^{-6}$ | Video (Buffered Streaming), TCP-based (e.g., www, e-mail, chat, ftp, p2p file sharing, progressive video, etc.) |
| 9 | | 9 | | | |
| 10 | GBR | 10 | 50 ms | $10^{-3}$ | High priority M2M applications |
| 11 | Non-GBR | 11 | 300 ms | $10^{-6}$ | Normal priority M2M applications |
| 12 | | 12 | 500 ms | $10^{-6}$ | Low priority M2M applications |

As depicted above, QCIs with value 1~9 are used for non-M2M applications, and QCIs with value 10~12 are used for M2M applications. It is to be understood that, more or less than 3 MCIs may be introduced for classifying the classes of M2M applications, and the invention is not limited thereto. For example, each of the QCIs with value 10~12 may be further divided into 2 QCIs in which one QCI is for signaling and another QCI is for traffic data. Alternatively, an additional MCI may be introduced for indicating a special class of M2M applications, which has a variable priority level. That is, the priority level of the special class of M2M applications may be dynamically reconfigured. In one embodiment, the special class of M2M applications may be reconfigured from one QCI to another QCI, and a QoS modification procedure is performed between the mobile communication device 110 and the service network 120 for re-negotiating a new QCI. In another embodiment, instead of introducing an additional MCI for the special class of M2M applications, any of the QCIs with value 10~12 may be reused for the special class of M2M applications, and the dynamical reconfiguration of the priority level for the special class of M2M applications may be implemented by performing a QoS modification procedure to re-negotiating a new QCI. Specifically, for the case where the reconfiguration of the priority level for the special class of M2M applications is initiated by the service network 120 (e.g., when the system loading of the service network 120 is too heavy), the service network 120 may have the Policy and Charging Rule Function (PCRF) entity to re-translate the Session Description Protocol (SDP) information into the new QCI, and then perform the QoS modification procedure. For the case where the reconfiguration of the priority level for the special class of M2M applications is initiated by the mobile communication device 110 (e.g., when an earthquake is detected by an earthquake monitoring application, or a leak of a monitored oil/gas-pipeline is detected by an oil/gas-pipeline monitoring application), an M2M application in that special class may trigger an emergency call, so that it may be reconfigured to have a higher priority level. In one embodiment, the emergency call may be made by transmitting an RRCConnectionRequest message with an establishment cause "M2M emergency call" to the service network 120. The detailed description of the QoS negotiation procedure and the QoS modification procedure is omitted herein as it is beyond the scope of the invention, and reference may be made to the 3GPP standard. Note that, the application-based class identification using the MCIs may also be applied for the situations where the M2M application is initiated by the service network 120, instead of the mobile communication device 110.

In addition to introducing MCIs for class identification of M2M applications, the invention proposes an M2M access control mechanism for providing classes for M2M applications and controlling the access of the M2M applications according to their corresponding classes. To further clarify, when initiating an M2M application, the controller module 112 may first determine the class of the M2M application according to the predetermined classification information, and then determine the priority level corresponding to the class of the M2M application. Specifically, the classification information may be predetermined in the application layer of the communication protocol (e.g., the communication protocol for UMTS/LTE/LTE-Advanced, depending on the RAT in use) or may be stored in the user subscriber identity card (e.g., a Universal Subscriber Identity Module (USIM)) for the application layer of the communication protocol to obtain, and the class of the M2M application may be passed down from the application layer to the Non-Access Stratum (NAS) layer and the Radio Resource Control (RRC) layer in the communication protocol for determining the priority level, wherein the communication between the application layer and the NAS/RRC layer may be performed using the Session Description Protocol (SDP) or Session Initiation Protocol (SIP). In one embodiment, the M2M applications may be divided into a fixed-priority class and a variable-priority class, and the fixed-priority class may be further divided into a high-priority class, a normal-priority class, and a low-priority class. That is, the M2M applications may be divided into 4 classes, and the controller module 112 may determine the priority level of an M2M application according to the class of the M2M application. If the M2M application has a high-priority class, the corresponding priority level may be determined to be high. If the M2M application has a normal-priority class, the corresponding priority level may be determined to be normal. If the M2M application has a low-priority class, the corresponding priority level may be determined to be low. Otherwise, if the M2M application has a variable-priority class, the corresponding priority level may be dynamically determined according to system information broadcasted by the service network 120 or according to device settings pre-configured in the mobile communication device 110, wherein the device settings may be re-configured via Open Mobile Alliance (OMA) Device Management (DM) protocol. After determining priority level corresponding to the class of the M2M application, the controller module 112 retrieves the barring rate and barring status flag of the priority level from the system information broadcast, and determines whether to access the service network 120 for the M2M application according to the baring rate and barring status flag, wherein the barring rate indicates a specific rate for limiting the access probability of the M2M application, and the barring status flag indicates whether the access control should be applied for the M2M application. In one embodiment, the service network 120 may determine the barring rate according to its system loading and the priority level corresponding to the barring rate. The barring status flag may have a Boolean value for indicating whether the access control should be applied for the M2M application, e.g., a "TRUE" value indicates to apply the access control of the M2M application, and a "FALSE" value indicates not to apply the access control of the M2M application. Specifically, if the barring status flag indicates to apply the access control of the M2M application, the controller module 112 may first generate a random number and determine whether to access the service network 120 for the M2M application according to the comparison result of the baring rate and the random number. If the random number is greater than the barring rate, the access to the service network 120 for the M2M application is allowed. Otherwise, if the random number is equal to or less than the barring rate, the access to the service network 120 for the M2M application is forbidden. For example, if the M2M application has a normal-priority class and the barring rate of the normal priority level is 0.5, the controller module 112 generates a random number between 0 and 1, and the access to the service network 120 for the M2M application is only allowed if the generated random number is greater than 0.5.

In certain situations where the M2M application run on the mobile communication device 110 has critical and/or delay-sensitive data to report to the service network 120, the mobile communication device 110 may dynamically change the priority level corresponding to the class of the M2M application by enabling the M2M application to trigger an emergency call. In one embodiment, the emergency call may be made by transmitting an RRCConnectionRequest message with an establishment cause "M2M emergency call" to the service network 120. Since the emergency call generally has a higher priority level than the other applications, the controller module 112 may use the barring rate corresponding to the high-priority class for carrying out the access control mechanism. Alternatively, for the M2M application triggering an emergency call, the controller module 112 may allow access to the service network 120 for the M2M application without carrying out the access control mechanism.

Figure 2:
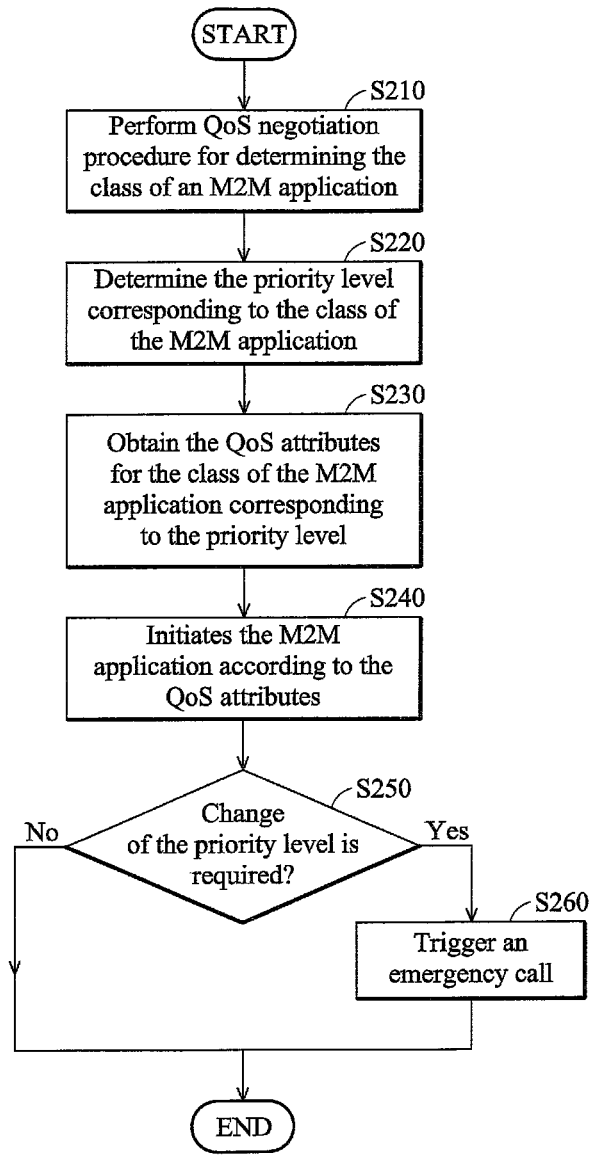
FIG. 2 is a flow chart illustrating the class identification method for M2M applications using M2M Class Identifiers (MCIs) by a mobile communication device according to an embodiment of the invention.

FIG. 2 is a flow chart illustrating the class identification method for M2M applications using MCIs by a mobile communication device according to an embodiment of the invention. The class identification method may be applied in any communication device supporting one or more of the Wideband Code Division Multiple Access (WCDMA) technology, the LTE technology, and the LTE-Advanced technology. To begin, the mobile communication device first performs a QoS negotiation procedure with a service network for determining the class of an M2M application (step S210). With the class of the M2M application, the mobile communication device then determines the priority level corresponding to the class of the M2M application according to a predetermined mapping relation between a plurality of priority levels and a plurality of classes for M2M applications (step S220). In one embodiment, the predetermined mapping relation may be a QCI table as shown in Table 1, which contains the relationships between the classes of non-M2M applications and M2M applications and the priority levels corresponding to the classes. Next, the mobile communication device obtains the QoS attributes for the class of the M2M application corresponding to the priority level (step S230), and initiates the M2M application according to the QoS attributes (step S240). Specifically, the QoS attributes may contain a resource type indicating whether a GBR or Non-GBR is used, a packet delay budget, and a packet error loss rate for the M2M application. During the M2M application, if the mobile communication device detects that the priority level is required to be changed (step S250), the M2M application is enabled to trigger an emergency call (step S260) which has a higher priority level than the other applications, so that the data of the M2M application may be delivered to the service network as soon as possible. For example, the emergency call may be triggered, when an earthquake or a leak of an oil/gas pipeline is detected, to raise the priority level of the M2M application.

Figure 3:
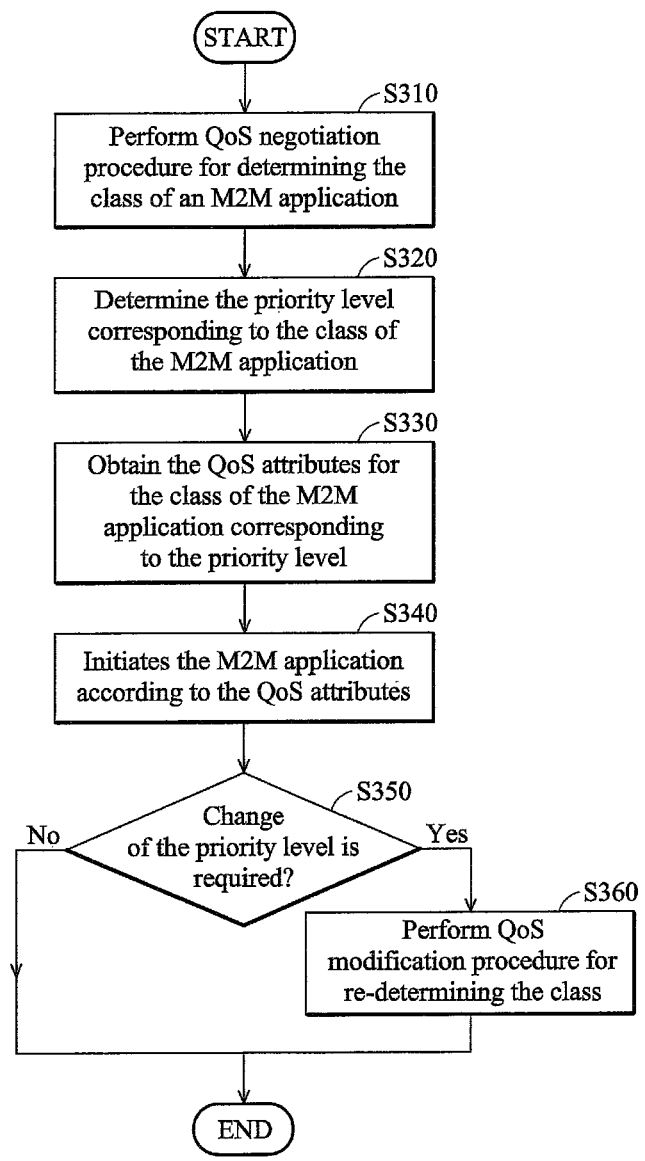
FIG. 3 is a flow chart illustrating the class identification method for M2M applications using MCIs by a service network according to an embodiment of the invention.

FIG. 3 is a flow chart illustrating the class identification method for M2M applications using MCIs by a service network according to an embodiment of the invention. Similar to FIG. 2, the class identification method may be applied in any service network supporting one or more of the WCDMA technology, the LTE technology, and the LTE-Advanced technology. To begin, the service network first performs a QoS negotiation procedure with a mobile communication device for determining the class of an M2M application (step S310). With the class of the M2M application, the service network then determines the priority level corresponding to the class of the M2M application according to a predetermined mapping relation between a plurality of priority levels and a plurality of classes for M2M applications (step S320). In one embodiment, the predetermined mapping relation may be a QCI table as shown in Table 1, which contains the relationships between the classes of non-M2M applications and M2M applications and the priority levels corresponding to the classes. Next, the service network obtains the QoS attributes for the class of the M2M application corresponding to the priority level (step S330), and initiates the M2M application according to the QoS attributes (step S340). Specifically, the QoS attributes may contain a resource type indicating whether a GBR or Non-GBR is used, a packet delay budget, and a packet error loss rate for the M2M application. During the M2M application, if the service network detects that the priority level is required to be changed (step S350), it performs a QoS modification procedure with the mobile communication device for re-determining the class (step S360). For example, the QoS modification procedure may be performed, when the system status of the service network is overloaded, to lower the priority level of the M2M application.

Figure 4:
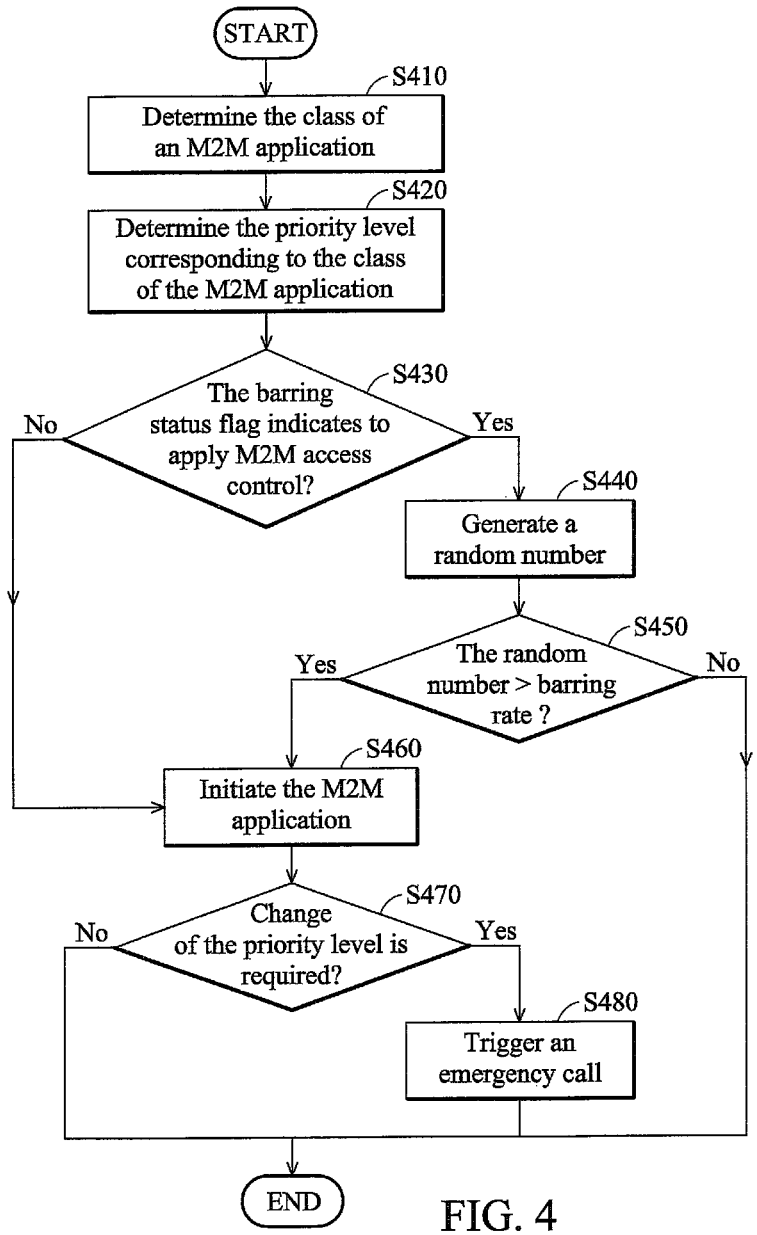
FIG. 4 is a flow chart illustrating the class identification method for M2M applications using the M2M access control mechanism according to an embodiment of the invention.

FIG. 4 is a flow chart illustrating the class identification method for M2M applications using the M2M access control mechanism according to an embodiment of the invention. The class identification method may be applied in any communication device supporting one or more of the WCDMA technology, the LTE technology, and the LTE-Advanced technology. To begin, the mobile communication device first determines the class of an M2M application according to the predetermined classification information (step S410). In one embodiment, the classification information may be predetermined in the application layer of the communication protocol in the mobile communication device, or may be stored in the user subscriber identity card coupled to or in the mobile communication device. Next, the mobile communication device determines the priority level corresponding to the class of the M2M application (step S420). In one embodiment, the corresponding priority level may be determined according to system information broadcast of a service network. In another embodiment, the corresponding priority level may be determined according to device settings pre-configured in the mobile communication device. Next, the mobile communication device determines whether the barring status flag corresponding to the priority level in the system information broadcast indicates whether the M2M access control should be applied (step S430). If so, the mobile communication device generates a random number (step S440), and determines whether the random number is greater than the barring rate corresponding to the priority level in the system information broadcast (step S450). If the random number is greater than the barring rate, the mobile communication device initiates the M2M application (step S460). During the M2M application, if the mobile communication device detects that the priority level is required to be changed (step S470), it enables the M2M application to trigger an emergency call (step S480) which has a higher priority level than the other applications, so that the data of the M2M application may be delivered to the service network as soon as possible. For example, the emergency call may be triggered, when an earthquake or a leak of an oil/gas pipeline is detected, to raise the priority level of the M2M application. Subsequent to step S430, if the barring status flag corresponding to the priority level in the system information broadcast indicates that the M2M access control should not be applied, step S460 is performed. It is noted that, the service network may also change the priority level of the M2M application by modifying the related information in the system information broadcast, such as the barring status flag and the barring rate corresponding to the M2M application.

While the invention has been described by way of example and in terms of preferred embodiment, it is to be understood that the invention is not limited thereto. Those who are skilled in this technology can still make various alterations and modifications without departing from the scope and spirit of this invention. For example, the class identification method for M2M applications may be applied in mobile communication devices and service networks in compliance with any evolutionary technology of the WCDMA/LTE/LTE-Advanced technology. Therefore, the scope of the invention shall be defined and protected by the following claims and their equivalents.

What is claimed is:

1. A mobile communication device, comprising:
a wireless module, performing wireless transmissions and receptions to and from a service network; and
a controller module:
determining a class of a Machine-to-Machine (M2M) application,
determining a priority level corresponding to the class of the M2M application, and
initiating the M2M application via the wireless module according to at least one M2M parameter corresponding to the priority level, wherein:
the determination of the class further comprises performing a Quality of Service (QoS) negotiation procedure with the service network via the wireless module for determining the class of the M2M application,
the priority level is determined according to a predetermined mapping relation between a plurality of priority level and a plurality of classes for M2M applications, wherein one or more of the plurality of classes for the M2M applications comprise a signaling class for the M2M applications and a data traffic class for the M2M applications,
the predetermined mapping relation contains relationships between the classes of non-M2M applications and M2M applications and the priority levels correspondingly,
the at least one M2M parameter comprises a combination of QoS attributes for the class of the M2M application corresponding to the priority level, and
the QoS attributes comprise a packet loss error rate.

2. The mobile communication device of claim 1, wherein the at least one M2M parameter further comprises any combination of the following QoS attributes for the class of the M2M application corresponding to the priority level:
resource type indicating whether a Guaranteed Bit Rate (GBR) or Non-GBR is used; and
packet delay budget.

3. The mobile communication device of claim 1, wherein the priority level is determined according to system information broadcasted by the service network or according to device settings pre-configured in the mobile communication device.

4. The mobile communication device of claim 1, wherein the at least one M2M parameter is included in system information broadcasted by the service network and comprises a barring rate and a barring status flag for access control of the class of the M2M application corresponding to the priority level.

5. The mobile communication device of claim 4, wherein the controller module further generates a random number in response to the barring status flag having a TRUE value, and the initiation of the M2M application is performed in response to the random number being greater than the barring rate.

6. The mobile communication device of claim 1, wherein the M2M application triggers an emergency call in response to detecting that the priority level is required to be changed, and the emergency call has a higher priority level than the priority level that is previously determined for the M2M application.

7. The mobile communication device of claim 6, wherein the M2M application is an earthquake monitoring application or an oil or gas pipeline monitoring application, and the change of the priority level is required when an earthquake is detected or a leak of a monitored oil or gas pipeline is detected.

8. A class identification method for Machine-to-Machine (M2M) applications by a mobile communication device, comprising:
determining a class of an M2M application;
determining a priority level corresponding to the class of the M2M application, wherein the determining of the class further comprises performing a Quality of Service (QoS) negotiation procedure with a service network via a wireless module for determining the class of the M2M application, the priority level is determined according to a predetermined mapping relation between a plurality of priority levels and a plurality of classes for M2M applications, and the predetermined mapping relation contains relationships between the classes of non-M2M applications and M2M applications and the priority levels correspondingly, wherein one or more of the plurality of classes for the M2M applications comprise a signaling class for the M2M applications and a data traffic class for the M2M applications; and
initiating the M2M application according to at least one M2M parameter corresponding to the priority level, wherein the at least one M2M parameter comprises a combination of QoS attributes for the class of the M2M application corresponding to the priority level, and wherein the QoS attributes comprise a packet loss error rate.

9. The class identification method of claim 8, wherein the at least one M2M parameter further comprises any combination of the following QoS attributes for the class of the M2M application corresponding to the priority level:
resource type indicating whether a Guaranteed Bit Rate (GBR) or Non-GBR is used; and
packet delay budget.

10. The class identification method of claim 8, wherein the priority level is determined according to system information broadcasted by the service network or according to device settings pre-configured in the mobile communication device.

11. The class identification method of claim 8, wherein the at least one M2M parameter is included in system information broadcasted by the service network and comprises a barring rate and a barring status flag for access control of the class of the M2M application corresponding to the priority level.

12. The class identification method of claim 11, further comprising generating a random number in response to the barring status flag having a TRUE value, wherein the initiation of the M2M application is performed in response to the random number being greater than the barring rate.

13. The class identification method of claim 8, wherein the M2M application triggers an emergency call in response to detecting that the priority level is required to be changed, and the emergency call has a higher priority level than the priority level that is previously determined for the M2M application.

14. The class identification method of claim 13, wherein the M2M application is an earthquake monitoring application or an oil or gas pipeline monitoring application, and the change of the priority level is required when an earthquake is being detected or a leak of a monitored oil or gas pipeline is being detected.

15. A service network, comprising:
an access node, performing wireless transmissions and receptions to and from a mobile communication device; and
a control node, determining a class of a Machine-to-Machine (M2M) application,
determining a priority level corresponding to the class of the M2M application, and initiating the M2M application via the access node according to at least one M2M parameter corresponding to the priority level, wherein:
determination of the class comprises performing a Quality of Service (QoS) negotiation procedure with the mobile communication device via the access node for determining the class of the M2M application,
the priority level is determined according to a predetermined mapping relation between a plurality of priority levels and a plurality of classes for M2M applications,
the predetermined mapping relation contains relationships between the classes of non-M2M applications and M2M applications and the priority levels correspondingly, wherein one or more of the plurality of classes for the M2M applications comprise a signaling class for the M2M applications and a data traffic class for the M2M applications, the at least one M2M parameter comprises a combination of QoS attributes for the class of the M2M application corresponding to the priority level, and
the QoS attributes comprise a packet loss error rate.

16. The service network of claim 15, wherein the class is determined according to a current system loading of the service network.

17. The service network of claim 15, wherein the control node further performs a QoS modification procedure with the mobile communication device via the access node for re-determining the class, in response to detecting that the service network is overloaded.

18. The service network of claim 15, wherein the at least one M2M parameter further comprises any combination of the following QoS attributes for the class of the M2M application corresponding to the priority level:
resource type indicating whether a Guaranteed Bit Rate (GBR) or Non-GBR is used; and
packet delay budget.

19. The service network of claim 15, wherein the priority level is determined according to a current system loading of the service network, and the control node further includes the priority level in a system information broadcast to the mobile communication device.

20. The service network of claim 15, wherein the at least one M2M parameter is included in system information broadcast to the mobile communication device and comprises a barring rate and a barring status flag for access control of the class of the M2M application corresponding to the priority level, and the barring rate is determined according to a current system loading of the service network.

21. The service network of claim 20, wherein the mobile communication device further generates a random number in response to the barring status flag having a TRUE value, and the initiation of the M2M application is performed in response to the random number being greater than the barring rate.

22. The service network of claim 20, wherein the control node further re-determines the barring rate and broadcasts the system information updated with the re-determined barring rate to the mobile communication device, in response to detecting that the service network is overloaded.

23. A class identification method for Machine-to-Machine (M2M) applications by a service network, comprising:
determining a class of a Machine-to-Machine (M2M) application;
determining a priority level corresponding to the class of the M2M application, wherein:
determination of the class further comprises performing a Quality of Service (QoS) negotiation procedure with a mobile communication device via an access node for determining the class of the M2M application, and
the priority level is determined according to a predetermined mapping relation between a plurality of priority levels and a plurality of classes for M2M applications, and
the predetermined mapping relation contains relationships between the classes of non-M2M applications and M2M applications and the priority levels correspondingly, wherein one or more of the plurality of classes for the M2M applications comprise a signaling class for the M2M applications and a data traffic class for the M2M applications; and
initiating the M2M application via the access node according to at least one M2M parameter corresponding to the priority level, wherein the at least one M2M parameter comprises a combination of QoS attributes for the class of the M2M application corresponding to the priority level, and wherein the QoS attributes comprise a packet loss error rate.

24. The class identification method of claim 23, wherein the class is determined according to a current system loading of the service network.

25. The class identification method of claim 23, further comprising performing a QoS modification procedure with the mobile communication device for re-determining the class, in response to detecting that the service network is overloaded.

26. The class identification method of claim 23, wherein the at least one M2M parameter further comprises any combination of the following QoS attributes for the class of the M2M application corresponding to the priority level:
resource type indicating whether a Guaranteed Bit Rate (GBR) or Non-GBR is used; and
packet delay budget.

27. The class identification method of claim 23, wherein the priority level is determined according to a current system loading of the service network, and the class identification method further comprises including the priority level in a system information broadcast to the mobile communication device.

28. The class identification method of claim 23, wherein the at least one M2M parameter is included in system information broadcasted by the service network and comprises a barring rate and a barring status flag for access control of the class of the M2M application corresponding to the priority level, and the barring rate is determined according to a current system loading of the service network.

29. The class identification method of claim 28, wherein the mobile communication device further generates a random number in response to the barring status flag having a TRUE value, and the initiation of the M2M application is performed in response to the random number being greater than the barring rate.

30. The class identification method of claim 28, further comprising re-determining the barring rate and broadcasting the system information updated with the re-determined barring rate to the mobile communication device, in response to detecting that the service network is overloaded.

* * * * *